United States Patent
Doyle

(10) Patent No.: US 10,410,214 B2
(45) Date of Patent: Sep. 10, 2019

(54) SYSTEM AND METHOD FOR FINANCIAL TRANSACTION VALIDATION

(75) Inventor: Paul F. Doyle, Ada, MI (US)

(73) Assignee: Deluxe Small Business Sales, Inc., Shoreview, MN (US)

( * ) Notice: Subject to any disclaimer, the term of this patent is extended or adjusted under 35 U.S.C. 154(b) by 426 days.

(21) Appl. No.: 12/351,551

(22) Filed: Jan. 9, 2009

(65) Prior Publication Data
US 2009/0182672 A1    Jul. 16, 2009

Related U.S. Application Data

(60) Provisional application No. 61/020,420, filed on Jan. 11, 2008.

(51) Int. Cl.
| | |
|---|---|
| G06Q 20/40 | (2012.01) |
| G06F 21/64 | (2013.01) |
| G06Q 20/04 | (2012.01) |
| G06Q 20/38 | (2012.01) |
| G06Q 30/06 | (2012.01) |
| H04L 9/32 | (2006.01) |

(52) U.S. Cl.
CPC .......... *G06Q 20/40* (2013.01); *G06F 21/64* (2013.01); *G06Q 20/042* (2013.01); *G06Q 20/382* (2013.01); *G06Q 20/4037* (2013.01); *G06Q 30/0603* (2013.01); *H04L 9/3236* (2013.01); *G06F 2221/2135* (2013.01); *H04L 2209/56* (2013.01)

(58) Field of Classification Search
USPC ..................................................... 705/50–79
See application file for complete search history.

(56) References Cited

U.S. PATENT DOCUMENTS

| | | | |
|---|---|---|---|
| 5,673,320 A | * | 9/1997 | Ray et al. ...................... 713/176 |
| 6,170,744 B1 | * | 1/2001 | Lee et al. ...................... 235/380 |
| 6,381,696 B1 | | 4/2002 | Doyle |
| 6,611,598 B1 | * | 8/2003 | Hayosh ............... G06Q 20/042 380/54 |

(Continued)

FOREIGN PATENT DOCUMENTS

| | | |
|---|---|---|
| EP | 2250617 | 11/2010 |
| KR | 1020040063988 A | 7/2004 |

OTHER PUBLICATIONS

Md5Checker (website published on Oct. 24, 2019 at http://getmd5checker.com/).*

(Continued)

*Primary Examiner* — James M Detweiler
(74) *Attorney, Agent, or Firm* — Schwegman Lundberg & Woessner, P.A.

(57) ABSTRACT

A system and method for identifying and validating indicia representative of at least one of a document and a transaction and a set of data by an originating party involves at least one of a document and a transaction and a set of data having at least one information item original to the at least one of a document and a transaction and a set of data. An identifier representative of the at least one information item original to the at least one of a document and a transaction and a set of data is generated. The integrity of the integrity of the at least one of a document and a transaction and a set of data is validated by using the identifier to determine whether at least one information item of the at least one of a document and a transaction and a set of data has not been altered from the at least one information item original to the at least one of a document and a transaction and a set of data.

13 Claims, 6 Drawing Sheets

(56) References Cited

U.S. PATENT DOCUMENTS

| | | | |
|---|---|---|---|
| 7,017,046 | B2 | 3/2006 | Doyle et al. |
| 7,047,415 | B2 | 5/2006 | Doyle et al. |
| 7,566,002 | B2 * | 7/2009 | Love et al. .................. 235/380 |
| 2004/0001568 | A1 | 1/2004 | Impson et al. |
| 2006/0112013 | A1 * | 5/2006 | Maloney ................ G06Q 20/04 705/45 |
| 2007/0088953 | A1 * | 4/2007 | Hilton ................ G07D 7/0043 713/176 |
| 2007/0156438 | A1 * | 7/2007 | Popadic ............ G06Q 20/0425 229/71 |
| 2007/0170265 | A1 | 7/2007 | Sinclair et al. |
| 2007/0288518 | A1 | 12/2007 | Grigler et al. |
| 2008/0249951 | A1 * | 10/2008 | Gilder .................... G06Q 20/04 705/76 |

OTHER PUBLICATIONS

Timestamp, Time Stamp—Proofspace.com, http://www.proofspace.com/technology/timestamping.php; pp. 1-2, Jan. 15, 2009.

Proofspace, http://proofspace.com/technology/timestamping_2.php; pp. 1-2, Jan. 15, 2009.

"European Application Serial No. 09701458.3, Extended European Search Report dated Aug. 21, 2012", 4 pgs.

"European Application Serial No. 09701458.3, Response filed Mar. 15, 2013 to Extended European Search Report dated Aug. 21, 2012", 9 pgs.

"International Application Serial No. PCT/US2009/030627, International Preliminary Report on Patentability dated Jul. 22, 2010", 6 pgs.

"International Application Serial No. PCT/US2009/030627, International Search Report dated Jul. 27, 2009", 3 pgs.

"International Application Serial No. PCT/US2009/030627, Written Opinion dated Jul. 27, 2009", 4 pgs.

"Statement in Accordance With the Notice From the European Patent Office Dated Oct. 1, 2007 Concerning Business Methods", Epc / Erklaerung Gemaess Der Mitteilung Des Europaeischen Patentamts Vom Oct. 1, 2007 Ueber Geschaeftsrnethoden—Epu / Declaration Conformement Au Communique De L'office Europ, (Nov. 1, 2007), 592-593.

* cited by examiner

SYSTEM AND METHOD FOR FINANCIAL TRANSACTION VALIDATION

CROSS REFERENCE TO RELATED APPLICATIONS

This application claims the benefit of U.S. Provisional Application Ser. No. 61/020,420, filed Jan. 11, 2008, which is incorporated in its entirety by reference.

BACKGROUND OF THE INVENTION

Field of the Invention

The invention relates to systems methods of providing secure financial transactions, including an anti-tampering mechanism, and a method and system for a registry of documents for authentication.

Description of the Related Art

When purchasing a good or service, a buyer, or payer, can use any of a number of different methods to make a payment to a seller, or payee. Aside from using cash, payment is typically made using a credit or debit card, a check, a money order, or an electronic funds transfer. These and other non-cash payment methods are very convenient, particularly because they do not require the payer to have large amounts of cash on hand. In addition, it is unsafe (and in some cases illegal) to send cash to the payee by mail if the payee and payer are not in close geographical proximity.

Despite increased security measures, fraud continues to be an issue with non-cash payment methods. U.S. Pat. Nos. 7,047,415, 7,017,046, and 6,381,696, which are incorporated by reference herein in their entirety, disclose time-stamping technologies that are currently used for purposes of authenticating digital data. Payees and other entities involved in payment-related transactions often have little ability to verify the authenticity of non-cash payments, which makes it easy for payers to make fraudulent payments, especially by forging checks.

SUMMARY OF THE INVENTION

In a first aspect, the invention is a method for identifying and validating indicia representative of at least one of a document and a transaction and a set of data by an originating party. The at least one of a document and a transaction and a set of data has at least one information item original to the at least one of a document and a transaction and a set of data. The method comprising the steps generating an identifier representative of the at least one information item original to the at least one of a document and a transaction and a set of data, and validating the integrity of the at least one of a document and a transaction and a set of data by using the identifier to determine whether at least one information item of the at least one of a document and a transaction and a set of data has not been altered from the at least one information item original to the at least one of a document and a transaction and a set of data.

In another aspect, the invention is a system for identifying and validating indicia representative of at least one of a document and a transaction and a set of data by an originating party. The at least one of a document and a transaction and a set of data has at least one information item original to the at least one of a document and a transaction and a set of data. The system comprises a validation service that receives the at least one information item original to the at least one of a document and a transaction and a set of data and generates an identifier representative of the at least one information item original to the at least one of a document and a transaction and a set of data. The identifier can be used to validate the integrity of the at least one of a document and a transaction and a set of data by using the identifier to determine whether at least one information item of the at least one of a document and a transaction and a set of data has not been altered from the at least one information item original to the at least one of a document and a transaction and a set of data.

DESCRIPTION OF AN EMBODIMENT OF THE INVENTION

Figure 1:
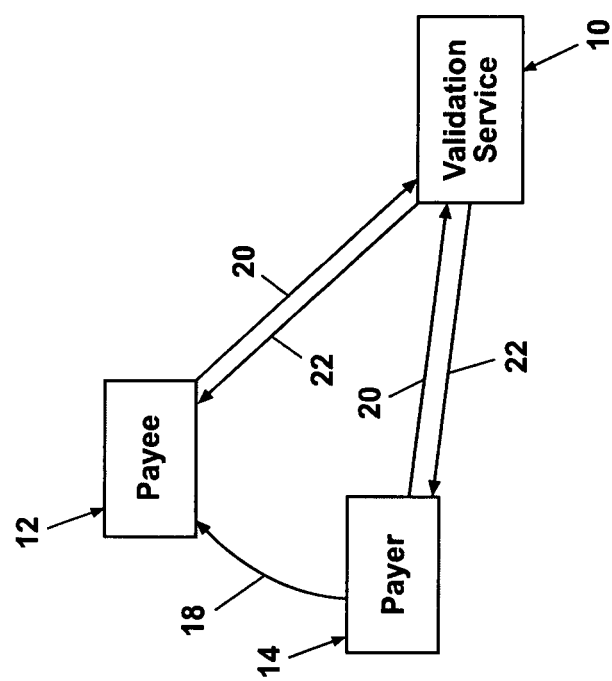
FIG. 1 depicts a schematic view of a check validation service and method according to the invention being used to validate a check being transferred from a payer to a payee.

FIG. 1 illustrates a validation service and method 10 according to the invention. A payer 14 is an entity who desires to send a payment to a payee 12, such as for a good or service. The payee 12 and payer 14 can each be an individual, a group of individuals, a business, or a group of businesses. The validation service 10 can be accessed via the internet, telephone, a dedicated line, a computer network, or any other means of communication enabling the communication of information to and from the validation service 10.

Figure 2:
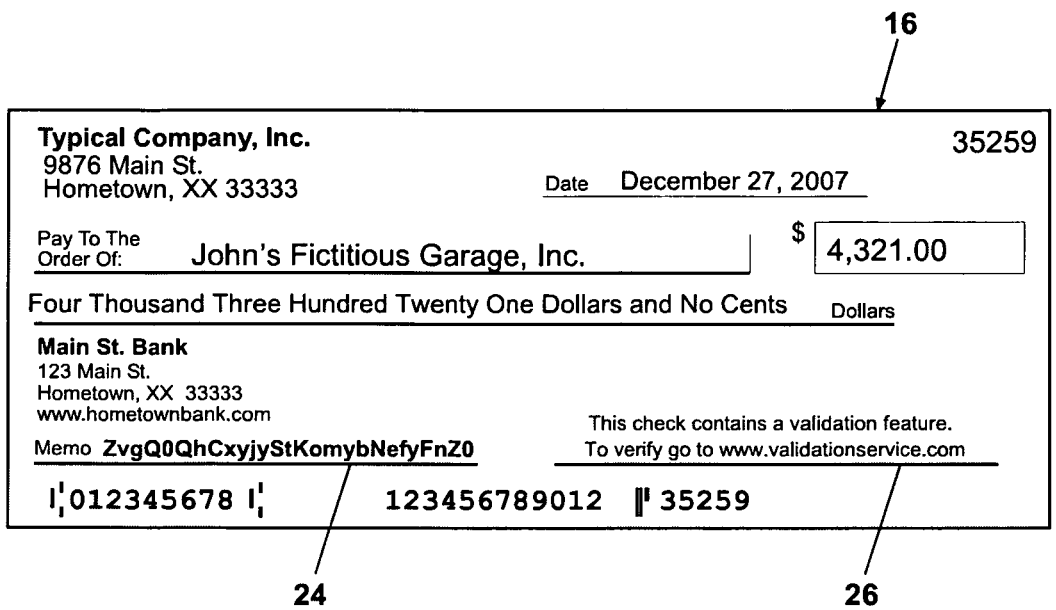
FIG. 2 illustrates the check that is transferred from the payer to the payee of FIG. 1.

The payer 14 can send payment to the payee 12 in the form of an enhanced check 16, an example of which is illustrated in detail in FIG. 2. The payer 14 defines the check 16 payment information for a given check number on a given account. Specific information, which can comprise one or more information items associated with and included on the check 16 in the form of indicia, is shown by example in FIG. 2, although it will be understood that the invention contemplates that any particular information can be applied to the check in the form of a payor, a payee, an amount (in numbers), an amount (written out in words), a date, a check number, a signature, a URL, a routing number, an account number, a check number, a bank name, an address, a telephone number, and the like singularly or in any combination thereof. The information can comprise numbers, letters, symbols, data, images, scannable information (e.g. a barcode), and the like. For example, the illustrative example check 16 shown in FIG. 2 is check number 35259 for account number 123456789012 for a bank having the routing number 012345678. The date of the check 16 is Dec. 27, 2007. The payee 12 is John's Fictitious Garage, Inc., and the check is for $4,321.00, which is written out as "Four Thousand Three Hundred Twenty One Dollars and No Cents."

In addition to payor, payee, and the like, other terms like originating party and subsequent processing party are used herein. It will be understood that the term originating party is not limited to the author of a document or the originator of a transaction, but also to the party first invoking the validation service 10, even if the originating party was not the author of a document or the originator of a transaction.

The validation service 10 is used by the payer 14 to generate a hash value 24 or cryptographic digest, which is an identifier corresponding to the information contained on the check 16. The validation service 10 can comprise a program or a portion thereof, a computer, a server, or any other entity suitable for the purposes described herein. Although the validation service 10 is illustrated herein as remote from the payer 14, other possible embodiments of the invention not described in detail herein can incorporate the validation service 10 or an additional instance enabling the functionality of the validation service 10 into any party that utilizes the inventive method and that is in communication with other parties utilizing the inventive method, such as the payee 12, payer 14, payee's bank 30, Federal Reserve 32, or payer's bank 34. For example, in an alternative embodiment in which the payor 14 has local access to an instance of the validation service 10, the check information is used to locally compute the hash value 24, and the hash value 24, either alone or together with the check information, is sent or provided to the remote validation service 10. The hash value 24 can be used as a security control to send a request 20 for validation of the check 16 by the validation service 10, which stores information pertaining to the check 16. This hash value 24 is included on the check 16, such as by the payer 14 writing the hash value 24 in the memo portion of the check 16. The information on the check 16 can also include contact information 26 for the validation service 10.

The hash value 24 is generated by a cryptographic hash function, which can be included on a server or computer that is associated with or accessible to the validation service 10 and/or the party computing the hash value 24. A cryptographic hash function is a deterministic procedure that takes data/information associated with the check 16 returns the hash value 24 in the form of a fixed-size bit string. Typically, the cryptographic hash function takes a string of any length as input and produces a fixed-length hash value 24.

The ideal hash function has four main properties: it is easy to compute the hash for any given data, it is extremely difficult to construct a text that has a given hash, it is extremely difficult to modify a given text without changing its hash, and it is extremely unlikely that two different messages will have the same hash. These requirements call for the use of advanced cryptography techniques, hence the name. Any accidental or intentional change to the data/information will almost certainly change the hash value 24. Cryptographic hash functions and hash values 24 have many applications, such as message integrity checks, digital signatures, authentication, and various information security applications. Hash values 24 can also be used as fingerprints for detecting duplicate data files, file version changes, and similar applications, or as checksums to guard against accidental data corruption.

The validation service 10 can perform a number of additional cryptographic operations, such as generating a trusted timestamp by any appropriate method, such as those disclosed in U.S. Pat. Nos. 7,047,415, 7,017,046, and 6,381,696, which are incorporated by reference herein in their entirety. For example, the timestamp can be generated using American National Standard X9.95-2005. Other exemplary methods include digital signature, linked token, linked token and digitally signed, and transient key, and other cryptographic techniques which would be apparent to one skilled in the art. The validation service 10 can also digitally sign according to the PKI Certificate Authority Method.

Alternatively, it is not a requirement that cryptography be employed to created the identifier according to the invention. For example, any information items can simply be self-reflecting and self-reference to the information that is original to the at least one of a document and a transaction and a data item. It is preferable that the identifier, in any form, be a meaningful representation of at least one information item on the at least one of a document and a transaction and a data item. The meaningful nature of the identifier would preferably be meaningful to a human reader or a machine-reader of the identifier.

After the transfer 18 of the check 16 from the payer 14 to the payee 12 as shown in FIG. 1, the payee 12 can send a request 20 for validation of the check 16 to the validation service 10. At least some of the information on the check 16 is used to generate the request 20. The information on the check 16 can include the hash value 24. This information can be sent to the validation service 10 as a data set. Validation of the check 16 can be accomplished in any suitable manner. Additional hash value 24 reference information, such as a source identifier, a token identifier, or other such information which associates the hash value 24 with the particular validation service 10, can be used to validate the check 16.

For example, the hash value 24 can be sent to the validation service 10, and the validation service 10 can perform a validation process on the hash value 24 by comparing the hash value 24 to a hash value 24 stored in memory or otherwise obtained by the validation service 10. Alternatively, the check information can be sent to the validation service 10 and then the validation service 10 can validate the check 16 based on the received check information. For example, the validation service 10 can use the cryptographic hash function to attempt to generate the same hash value 24 by inputting the information items on the check 16 into the cryptographic hash function. The validation service 10 can then compare the received hash value 24 and the newly generated hash value 24, and if the hash values 24 match, then the validation service 10 can establish that the integrity of the check 16 has not been compromised.

Validation of the check 16 can also be accomplished by sending a request 20 based on the bank routing number and account number to see if the numbers correspond to a user account. If a corresponding user account is located, then the payee 12 can query for the check number to validate if a hash value 24 had been generated for the specific check 16. Then the payee 12 can send a request 20 for a copy of the hash value 24 so that a local computation and comparison can be performed using a local instance of the validation service 10. This last method is especially useful in an instance where the payer 14 neglects to add the hash value 24 to the check 16, or if someone nefariously attempts to remove the hash value 24 from the check 16 to interfere with validation.

Once the validation service 10 has performed the validation, a validity response 22 is returned. The validity response 22 can be employed by the payee 12 to determine if the check is valid and legitimate and that the integrity of the information on the check 16 has not been compromised. If the validation fails, the payee 12 can then determine whether to refuse the check or take additional measures as a corrective action, such as by returning the check 16 to the payor 14.

As illustrated in FIGS. 3-6, the validation service 10 is also accessible to any other entities that may be involved in the processing of the payment, such as the payee's bank 30, the Federal Reserve 32, and the payer's bank 34. This ability for all involved entities to access the validation system 10 at every step of the process prevents any criminal behavior. Regardless of which method of validation is used, any change to the check 16 is easily detected because the check 16 is validated at every step during payment processing.

Figure 3:
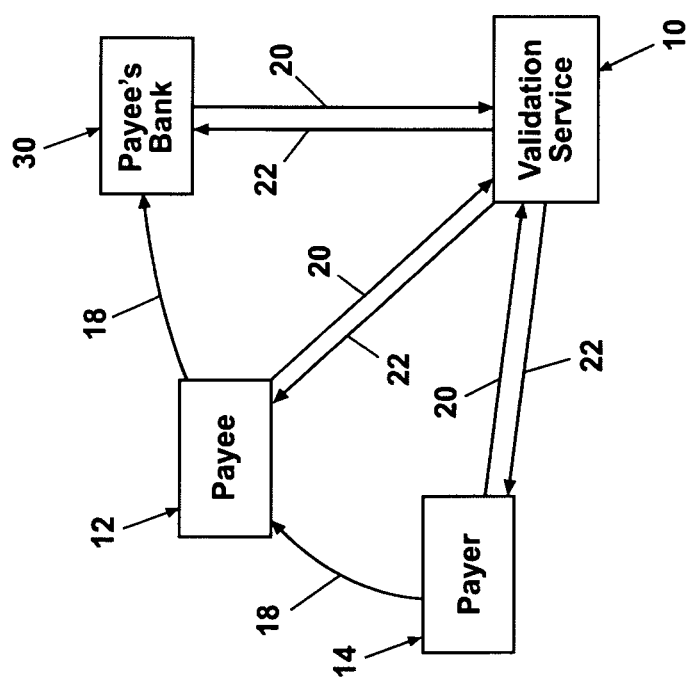
FIG. 3 depicts a schematic view of the check validation service and method according to the invention being used to validate the check of FIG. 2 as it is transferred from the payee to a payee's bank.

After the transfer 18 of the check 16 from the payer 14 to the payee 12 illustrated in FIG. 1, the payee 12 can present the check 16 to the payee's bank 30 for deposit. The payee's bank 30 can then access the validation service 10 and validate the check 16 prior to accepting a transfer 18 of the check 16 from the payee 12, which is illustrated in FIG. 3.

Figure 4:
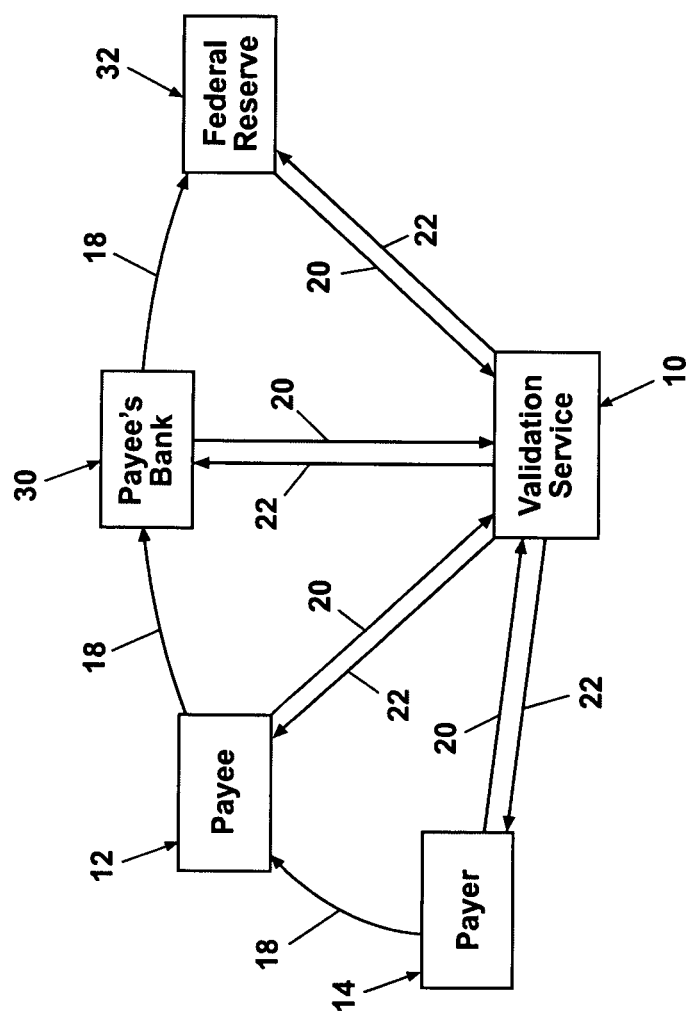
FIG. 4 depicts a schematic view of the check validation service and method according to the invention and being used to validate the check of FIG. 2 as it is transferred from the payee's bank to the Federal Reserve.

Looking now to FIG. 4, the payee's bank 30 can the present the check 16 to the Federal Reserve 32 for clearing and settlement. The Federal Reserve 32 can then access the validation service 10 and validate the check 16 prior to accepting a transfer 18 of the check 16 from the payee's bank 30.

Figure 5:
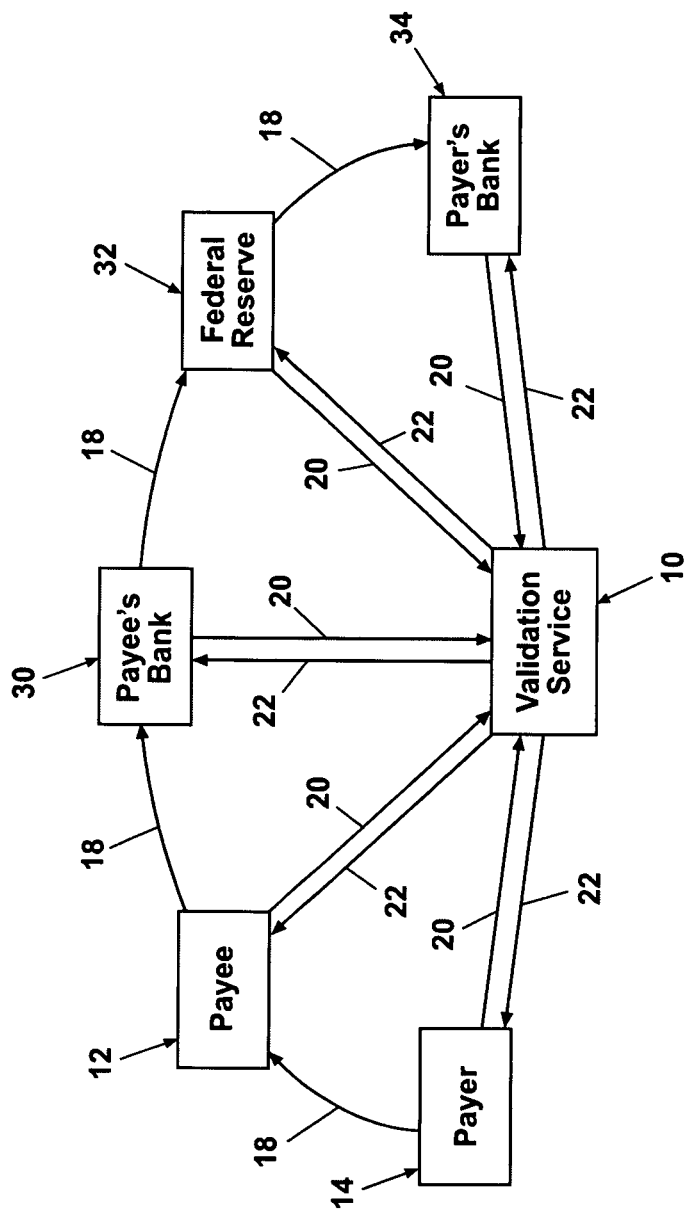
FIG. 5 depicts a schematic view of the check validation service and method according to the invention being used to validate the check of FIG. 2 as it is transferred from the Federal Reserve to a payer's bank.

Next, as shown in FIG. 5, the Federal Reserve 32 can present the check 16 to the payer's bank 34 for clearing and settlement. The payer's bank 34 can then access the validation service 10 and validate the check 16 prior to accepting a transfer 18 of the check 16 from the Federal Reserve 32.

Figure 6:
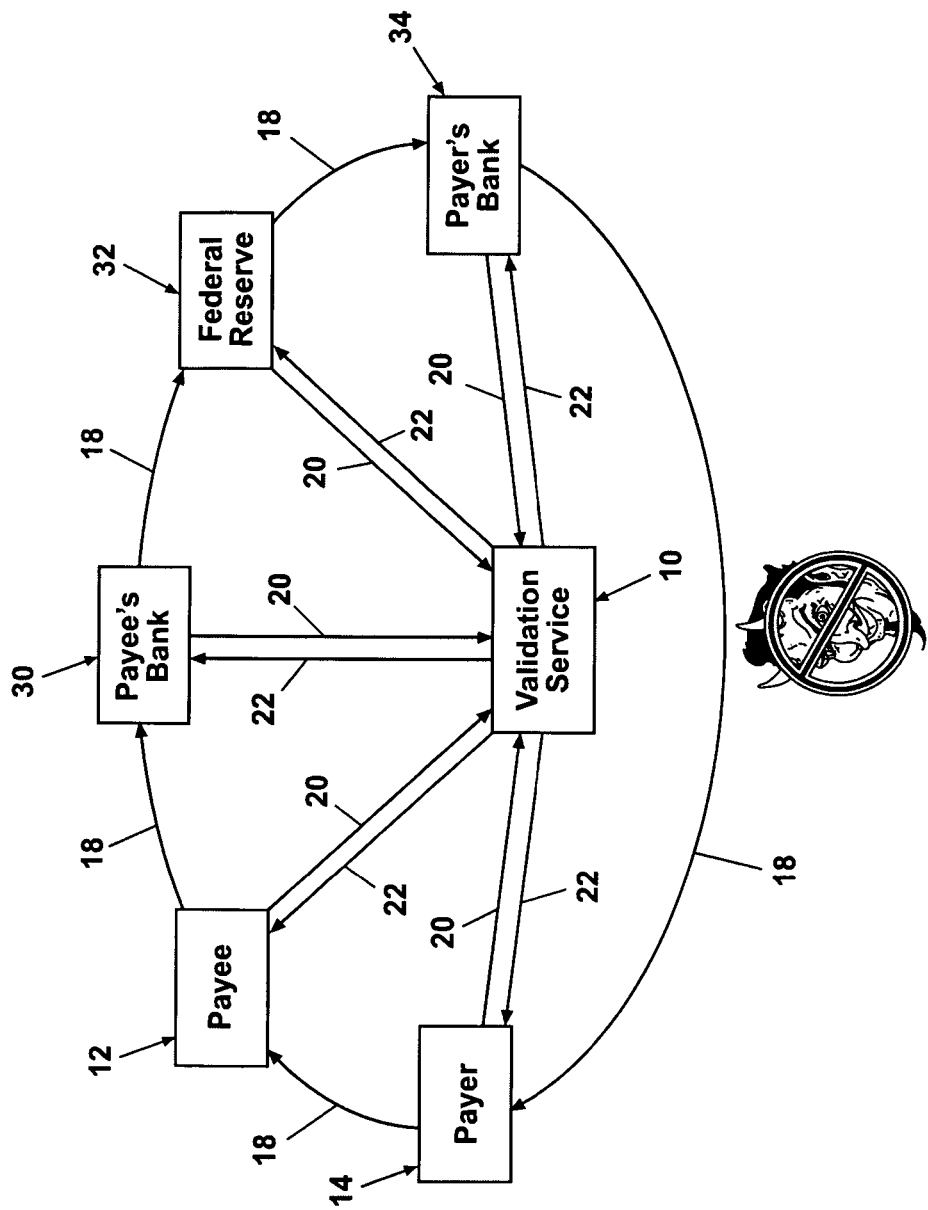
FIG. 6 depicts a schematic view of the check validation service and method according to the invention being used to validate the check of FIG. 2 as it is transferred from the payee's bank back to the payee.

Finally, as shown in FIG. 6, the payer's bank 34 can notify the payer 14 of the payment, and the payer 14 can compare the payment to its own records or validate the payment against its account with the validation service 10.

The validation service 10 and method according to the invention serves to block nefarious entities from injecting false and fraudulent checks into the payment processing system at each and every step. For example, if an employee at the payee's bank 30 alters the check 16 so as to make the check payable to a different entity than the payee 12, the Federal Reserve 32 will detect this change upon attempting to validate the check 16. This helps to increase the efficiency with which checks can be processed.

As can be seen, a benefit of the invention described herein is that the particular hash value 24 applied to a financial transaction, such as the check 16, can associate a trusted timestamp and cryptographic code with the information applied to the financial transaction. Alteration of either the hash value 24 or any of the information associated with the financial transaction (e.g. payor, payee, amount, and the like) will cause the validation step to fail. A nefarious transaction forger will be foiled in any attempt to divert the funds from the financial transaction, change the amount of the financial transaction, or to change the properties of the financial transaction, because any change to the information contained in the original financial transaction will cause the validation to fail and the transaction to be refused. An important feature of this invention is that the payor, payee, various banking institutions involved in the financial transaction, and the Federal Reserve are protected from clearing a bad or altered financial transaction before the transaction is processed by each individual entity, as opposed to current transaction clearance procedures that often leave any forgery or other alteration of information associated with the financial transaction undiscovered for some time, which prevents corrective action from being taken in a timely manner. This invention provides for the security of the financial transaction at each step of processing by requiring that the validation process is completed before the financial transaction is cleared and passed along for subsequent processing.

Although use of the validation service is discussed with respect to payment by check, the validation service can be used to validate any financial transaction or event, such as credit card transactions, ACH transactions, and electronic funds transfers. In addition, the validation service can be used to validate documents. For example, the validation service can be used to validate drivers' licenses, passports, birth certificates, or other such documents related to an individual's identity, emails, memos, and other business records, and medical records or prescriptions. The use of this validation service for documents, transactions, and sets of data beyond a check-related financial transaction would be apparent to one skilled in the art, and the particular check-related example provided herein shall not be construed to limit the scope of this invention.

Use of the validation service 10 can create meaningful information helpful in preventing counterfeits or authenticating genuine information. For example, the identifier and information items sent to and from the validation service 10 can identify not only the identity or asserted identity of a party, it can also include information relating to products (such as in a prescription), or geography, such as a check location. Therefore, fraud tracking and validation of information can be quickly tracked and accumulated to determine whether fraudulent, illegal or out-of-the-ordinary behavior is occurring in real-time, and often prior to an irrevocable event relating to a transaction, document or set of data (such as the cashing of a check or the dispensation of a prescription). Examples of such unexpected or fraudulent activity could be multiple checks for the same check number and account being attempted to be cashed at multiple locations, or prescriptions from a doctor spiking in frequency and drug type in a particular location (especially if remote from the doctor's office), or a passport or driver's license, e.g., being presented to an official at multiple contemporaneous locations (such as in an airport at multiple disparate locations). These and other beneficial fraud, illegal or behavioral-tracking data can all be accumulated as a result of the benefits afforded by the validation service 10. It should be noted that the converse to this accumulated data benefit is also valuable, such as if a credential, identity or otherwise, is being presented for the first time (such as if a driver's license being presented for the first time anywhere) an alert could be raised as well.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A system for identifying and validating alphanumeric information associated with a transaction, the system comprising:

a first non-transitory computer readable medium having first instructions encoded thereon that, when executed by one or more first processors, cause the one or more first processors to provide a remote instance of a validation service of a validation service provider by performing first operations, the first operations comprising:

receiving a first dataset, the first dataset comprising at least one information item provided by at least one originating party of the transaction that is necessary for the transaction to be processed by a subsequent party, the first dataset including alphanumeric data representing the transaction;

generating a first cryptographic identifier representative of and derived from at least a portion of the alphanumeric data of the received first dataset using a first hash function, wherein the first hash function generates hash values in the form of a fixed-size bit string;

storing an association between the first cryptographic identifier and a check number at the remote instance of the validation service;

receiving a request comprising a bank routing number and an account number from one or more second processors of the subsequent party providing a local instance of the validation service of the validation service provider, wherein the one or more second processors are distinct from and located remotely from the one or more first processors;

locating a corresponding user account based on the bank routing number and account number of the request;

transmitting an indication that the corresponding user account was located to the one or more second processors of the local instance of the validation service;

receiving, subsequent to transmitting the indication, a hash request comprising a check number from the one or more second processors of the local instance of the validation service;

locating the first cryptographic identifier using the stored association and the check number received in the hash request; and transmitting the located first cryptographic identifier to the one or more second processors of the local instance of the validation service; and a second non-transitory computer readable medium remote from the first non-transitory computer readable medium having second instructions encoded thereon that, when executed by the one or more second processors of the subsequent party, cause the one or more second processors provide the local instance of the validation service of the validation service provider by performing second operations, the second operations comprising:

receiving a second dataset, the second dataset comprising at least one information item provided by the at least one originating party of the transaction that is necessary for the transaction to be processed by the subsequent party, the second dataset including alphanumeric data representing the transaction;

generating a second cryptographic identifier representative and derived from at least a portion of alphanumeric data included in the received second dataset using a second hash function, wherein the second hash function generates hash values in the form of a fixed-size bit string;

transmitting the request comprising the bank routing number and the account number to the one or more first processors of the remote instance of the validation service;

receiving the indication that the corresponding user account was located from the one or more first processors of the remote instance of the validation service;

transmitting, subsequent to receiving the indication, the hash request comprising the check number to the one or more first processors of the remote instance of the validation service;

receiving the located first cryptographic identifier from the one or more first processors of the remote instance of the validation service;

comparing the second cryptographic identifier to the located first cryptographic identifier to determine if they match;

generating a validation request response based on the comparison; and transmitting the validation request response to the subsequent party.

2. The system of claim 1 wherein the first dataset comprises a document representative of the financial transaction between the at least one originating party and the subsequent party.

3. The system of claim 2 wherein the first non-transitory computer readable medium and one or more first processors of the remote instance of a validation service of the validation service provider are located remotely from a location of the financial transaction between the at least one originating party and the subsequent party.

4. The system of claim 1 wherein the first instructions, when executed by the one or more first processors of the remote instance of the validation service, cause the first cryptographic identifier to be physically imprinted on a physical representation of the first dataset.

5. The system of claim 4 wherein the subsequent party can view the imprinted first cryptographic identifier and query the validation service with at least one of the at least one information item and the physically imprinted identifier to confirm the integrity of the second dataset.

6. A method for validating a second dataset comprising alphanumeric information associated with a transaction that requires processing over a period of time, the method comprising:

receiving, by one or more first processors providing a remote instance of a validation service of a validation service provider by executing first instructions encoded on a first non-transitory computer readable medium, a first dataset, the first dataset comprising at least one information item provided by at least one originating party of the transaction that is necessary for the transaction to be processed by a subsequent party, the first dataset including alphanumeric data representing the transaction;

generating, by the one or more first processors providing the remote instance of the validation service, a first cryptographic identifier generated from and associated with alphanumeric information of the received first dataset using a first cryptographic hash function, wherein the first cryptographic hash function generates hash values in the form of a fixed-size bit string, storing, by the one or more first processors providing the remote instance of the validation service, the first cryptographic identifier in a non-transitory storage medium at the remote instance of the validation service;

storing, by the one or more first processors providing the remote instance of the validation service, an association between a check number and the first cryptographic identifier in a non-transitory storage medium;

receiving, by the one or more first processors providing the remote instance of the validation service, a request comprising a bank routing number and an account number from one or more second processors of the subsequent party providing a local instance of the validation service of the validation service provider by executing second instructions encoded on a second non-transitory computer readable medium, wherein the one or more second processors are distinct from and located remotely from the one or more first processors, wherein the second non-transitory computer readable medium is remote from the first non-transitory computer readable medium;

locating, by the one or more first processors providing the remote instance of the validation service, a corresponding user account based on the bank routing number and account number of the request;

transmitting, by the one or more first processors providing the remote instance of the validation service, an indication that the corresponding user account was located to the one or more second processors providing the local instance of the validation service;

receiving, subsequent to transmitting the indication and by the one or more first processors providing the remote instance of the validation service, a hash request comprising a check number from the one or more first processors providing the local instance of the validation service;

locating, by the one or more first processors providing the remote instance of the validation service, the first cryptographic identifier using the stored association and the check number;

transmitting, by the one or more first processors providing the remote instance of the validation service, the identified first cryptographic identifier to the one or more second processors providing the local instance of the validation service;

receiving, by the one or more second processors of the subsequent party providing the local instance of the validation service, a second dataset, the second dataset comprising at least one information item provided by the at least one originating party of the transaction that is necessary for the transaction to be processed by the subsequent party, the second dataset including alphanumeric data representing the transaction;

generating, by the one or more second processors at the local instance of the validation service, a second cryptographic identifier representative and derived from at least a portion of the alphanumeric data included in the received second dataset using a second hash function, wherein the second hash function generates hash values in the form of a fixed-size bit string;

transmitting, by the one or more second processors providing the local instance of the validation service, the request comprising the bank routing number and the account number to the one or more first processors providing the remote instance of the validation service;

receiving, by the one or more second processors providing the local instance of the validation service, the indication that the corresponding user account was located from the one or more first processors providing the remote instance of the validation service;

transmitting, subsequent to receiving the indication and by the one or more second processors providing the local instance of the validation service, the hash request comprising the check number to the one or more first processors providing the remote instance of the validation service;

receiving, by the one or more second processors providing the local instance of the validation service, the identified first cryptographic identifier from the one or more first processors providing the remote instance of the validation service;

comparing, by the one or more second processors providing the local instance of the validation service, the second cryptographic identifier with the identified first cryptographic identifier to determine whether they match;

validating, by the one or more second processors providing the local instance of the validation service, the second dataset upon determining that the second cryptographic identifier matches the identified first cryptographic identifier; and sending, by the one or more second processors providing the local instance of the validation service, a validation request response to the subsequent party, the validation request response including a result of the validation.

7. The method of claim 6 further comprising causing, by the one or more first processors at the remote instance of the validation service, the first cryptographic identifier to be applied to a visual representation of the transaction.

8. The method of claim 6 wherein the transaction comprises a physical check representative of a financial transaction.

9. The method of claim 8 wherein the first dataset comprises at least one of:
a payor, a payee, a numerical transaction amount, a transaction amount written out in words, a date, a check number, a signature, a URL, a routing number, an account number, a check number, a bank name, an address, and a telephone number.

10. The method of claim 9 wherein generating the first cryptographic identifier comprises associating the first cryptographic identifier with information representative of the at least one of:
a payor, a payee, a numerical transaction amount, a transaction amount written out in words, a date, a signature, a URL, a routing number, an account number, a bank name, an address, and a telephone number.

11. The method of claim 6 wherein the subsequent party is one of a payee, a payee's bank, the Federal Reserve, and a payor's bank.

12. The method of claim 6 wherein the first dataset comprises at least one item representative of a financial transaction.

13. The method of claim 6 wherein the first dataset comprises at least one of a routing number, a bank account number, a transaction number, a transaction amount, a payee, and a transaction date.

* * * * *